United States Patent [19]

Tanaka et al.

[11] Patent Number: 4,970,662

[45] Date of Patent: Nov. 13, 1990

[54] X-Y PLOTTER

[75] Inventors: Toshiaki Tanaka, Kawasaki; Takashi Arita, Hachioji; Kazuomi Ogata; Hiroyuki Iijima, both of Kawasaki, all of Japan

[73] Assignee: Fujitsu Limited, Kawasaki, Japan

[21] Appl. No.: 372,539

[22] Filed: Jun. 28, 1989

[30] Foreign Application Priority Data

Jun. 28, 1988 [JP] Japan .................................. 63-160373
Jun. 28, 1988 [JP] Japan .................................. 63-160374
Aug. 6, 1988 [JP] Japan .................................. 63-196781
Aug. 19, 1988 [JP] Japan .................................. 63-206731

[51] Int. Cl.$^5$ .......................................... G01D 15/00
[52] U.S. Cl. ................................. 364/520; 346/139 R
[58] Field of Search ........................... 364/518-523, 364/139 R, 140 R; 227/112; 271/196, 197

[56] References Cited

U.S. PATENT DOCUMENTS 4,792,249 12/1988 Lahr ..................................... 271/197
4,872,023 10/1989 Lake, Jr. et al. ..................... 364/520

Primary Examiner—Arthur G. Evans
Attorney, Agent, or Firm—Staas & Halsey

[57] ABSTRACT

An x-y plotter having a table on which a recording medium is to be carried, a linearly movable carriage which supports a writing tool so as to move up and down, a unit for linearly moving the recording medium along the plane of the medium in directions perpendicular to the directions of the movement of the carriage, and a first member for bringing only the portion of the recording medium located in the vicinity of a travel line along which the writing tool moves into close contact with the table and for lifting at least the portions of the recording medium located on opposite sides of the travel line, as viewed in the direction of the movement of the recording medium.

34 Claims, 10 Drawing Sheets

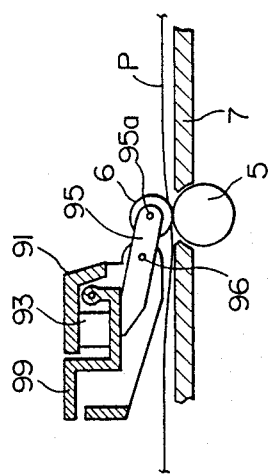
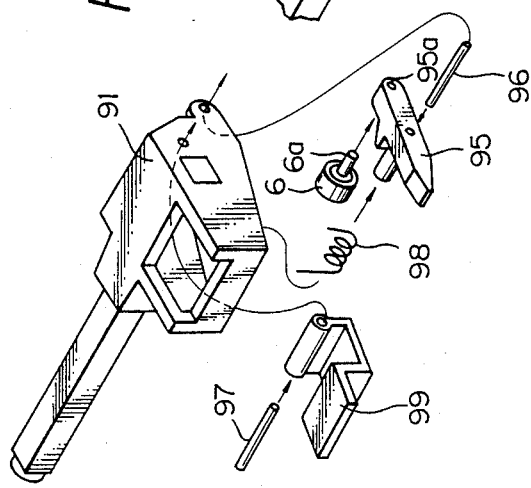
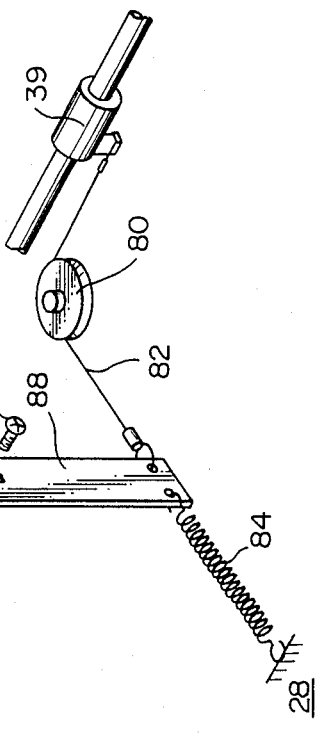

X-Y PLOTTER

BACKGROUND OF THE INVENTION

1. Field of the Invention

The present invention relates to an x-y plotter, and more particularly, it relates to an x-y plotter having an increased drawing speed and a reduced noise level.

2. Description of the Related Arts

With the growing use of personal computers, users want to display information processed by the computer as a picture, even in domestic use, and accordingly, there has long been a need for the realization of an inexpensive x-y plotter having a high efficiency (high speed, low noise, etc.).

Generally, an x-y plotter comprises a carriage which carries a writing pen and which is moved right and left (x-directions) by a motor through a drive belt, to draw a letter or a picture on a recording paper moved forward and backward (y-directions) perpendicularly to the x-directions, by a motor. The writing pen is supported in the carriage so as to be able to move upwardly and downwardly between an inoperative position, i.e., an upward position in which the pen is separated from the recording paper, and an operative position, i.e., a downward position (writing position) in which the pen comes into contact with the recording paper to draw a picture, etc. Namely, in the operative position, the pen and the paper are moved in the x-directions and the y-directions normal thereto, respectively, so that a desired two-dimensional picture or letter can be drawn on the paper.

The recording paper is held on a table (plate) by and between pinch rollers and friction rollers opposed thereto, so that the paper can be moved in the y-directions on the table in accordance with the rotation of the friction rollers, which are in turn driven by the motor.

A plurality of writing pens are stored in a rotatable pen holder, from which a desired pen is automatically and selectively taken by the carriage.

In the prior art, however, the recording paper may be partially separated from the table, especially when the paper is moved in the y-directions at a high speed. In particular, if the partial separation of the recording paper from the table takes place in the vicinity of the writing pen, the writing pen can be accidentally brought into contact with the recording paper even when the writing pen is in the inoperative position, i.e., in the upward position, and as a result of this undesirable contact of the recording paper with the writing pen, an unnecessary line or figure is drawn on the recording paper during the relative movement of the writing pen and the recording paper. To avoid the accidental contact of the recording paper with the writing pen, even if the paper is partially separated from the table, the displacement of the upward and downward movement of the writing pen must be increased, resulting in an increase of the time necessary for the upward and downward movement of the writing pen, and thus a higher drawing speed cannot be obtained.

Furthermore, since the paper is moved on the table while a substantial part of the recording paper is in slide-contact therewith, a relatively loud noise is caused due to the frictional surface contact between the recording paper and the table.

In the prior art, the presence and absence of a desired writing pen in the pen holder and on the carriage are optically detected by a transmission type photosensor or a reflection type photosensor. The transmission type photosensor has a light emitter and a light receiver opposed thereto, so that light emitted from the light emitter can be detected by the light receiver to detect the absence or presence of the pen in the pen holder or on the carriage. Similarly, the reflection type photosensor has a light emitter and a light receiver located on the same side of the pen holder or the carriage, so that light emitted from the light emitter and reflected from the object, i.e., the writing pen, can be detected by the light receiver to detect the absence or presence of the writing pen.

In this detecting mechanism of the prior art, however, a writing pen having a black body can not be detected by the reflection type photosensor, since the light is absorbed, and conversely, in a pen which has a transparent body whereby the contents therein are made visible, ink contained in the transparent body can not be detected by the transmission type photosensor, since the light is transmitted through the transparent body of the pen without detecting the presence thereof.

SUMMARY OF THE INVENTION

The object of the present invention is to eliminate the above-mentioned drawbacks.

Namely, the primary object of the present invention is to provide an x-y plotter in which only the portion of a recording paper that is located in the vicinity of a straight line, along which the writing pen is moved by the carriage, is brought into close contact with the table, and the remaining portion of the recording paper is slightly separated from the table so as to leave a slight clearance therebetween, so that the displacement of the upward and downward movement of the pen can be reduced, resulting in a higher drawing speed, and so as to reduce the noise caused by contact between the recording paper and the table.

Another object of the present invention is to provide an x-y plotter in which the presence or absence of a writing pen in the pen holder and on the carriage can be simply detected regardless of the kind (color, material, etc.) of the pen.

To achieve the above objects, according to the present invention, there is provided an x-y plotter comprising a table on which a recording medium (e.g., paper) is carried, a linearly movable carriage which supports a writing tool (e.g., pen) so as to move up and down, and means for linearly moving the recording paper along the plane of the paper in directions perpendicular to the directions of the movement of the carriage, the improvement comprising means for bringing only the portion of the recording paper that is located in the vicinity of a line, along which the writing pen moves, or travels, into close contact with the table and for lifting at least the portions of the recording paper that are located on the opposite sides of the line of travel line, as viewed in the direction of the movement of the recording paper.

With this arrangement, the recording paper moving on the table in the y-directions is brought into close contact with the table at the portion thereof on which the writing pen slides, so that an accidental separation or lifting of the recording medium from the table can be prevented. This results in a reduction of the upward displacement of the pen necessary for completely separating the front (lower) end of the pen from the recording paper, thus resulting in a higher drawing speed of the x-y plotter.

Furthermore, since the part of the paper, other than the portion that is brought into close contact with the table in the vicinity of the writing pen is lifted and separated from the table by air discharged from the discharge opening, the noise produced by the frictional surface contact between the table and the recording paper can be lowered even at a high speed movement of the paper.

Usually, an x-y plotter is provided with a cooling fan motor for cooling the electronic circuit components incorporated therein, and accordingly, the suction air can be easily produced by the existing fan motor without the provision of an additional special device therefor.

According to another aspect of the present invention, the x-y plotter further comprises a pen holder having a rotor which can detachably support a predetermined number of writing pens provided on the periphery of the rotor. The rotor is provided on the periphery thereof with slits in which the associated writing pens can be fitted. Pen caps, which are movable between an upper position in which the pen caps occupy an upper position when the writing pens are in the corresponding slits of the rotor and a lower position in which the pen caps cover the lower ends of the corresponding writing pens, are movably supported on the rotor to cap the lower ends of the writing pens. The slits, and accordingly the writing pens therein, can be detected by a photointerrupter.

With this arrangement, the presence or absence of the writing pens is detected by detecting the associated slits rather than by directly detecting the writing pens, and thus the detection can be performed regardless of the kind (material, color, etc.) of the writing pens.

BRIEF DESCRIPTION OF THE DRAWINGS

The invention will be described below in detail with reference to the accompanying drawings, in which:

FIGS. 3 and 4 are an exploded perspective view and a sectional view of a mechanism for separating pinch rollers from a recording paper, shown in FIG. 1;

DESCRIPTION OF THE PREFERRED EMBODIMENTS

Figure 1:
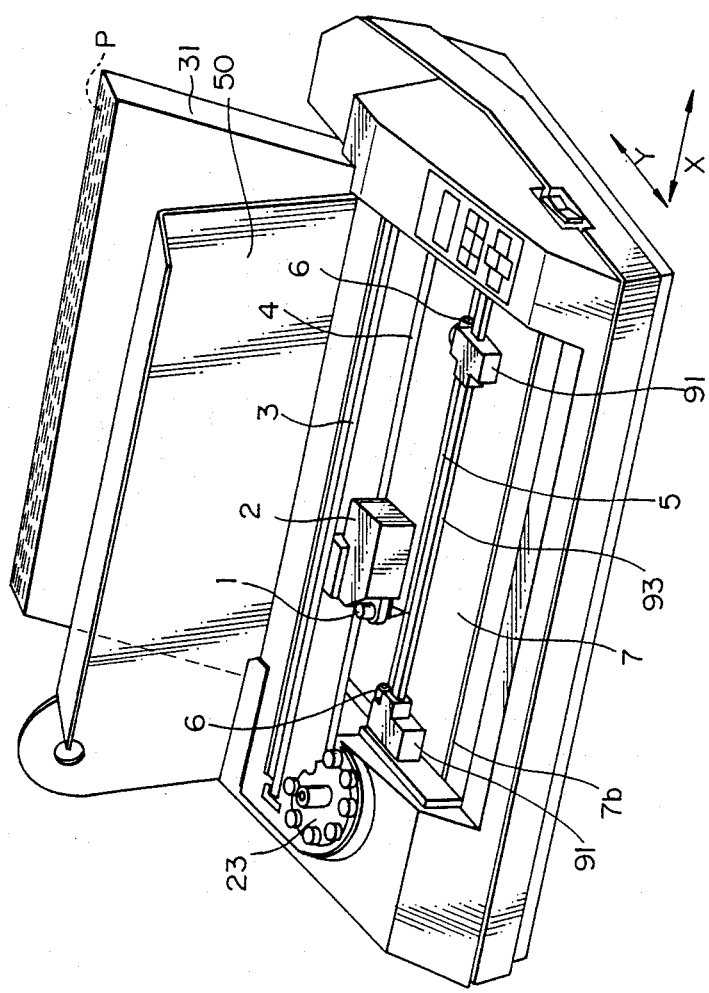
FIG. 1 is a perspective view of an x-y plotter according to an aspect of the present invention.
Figure 2:
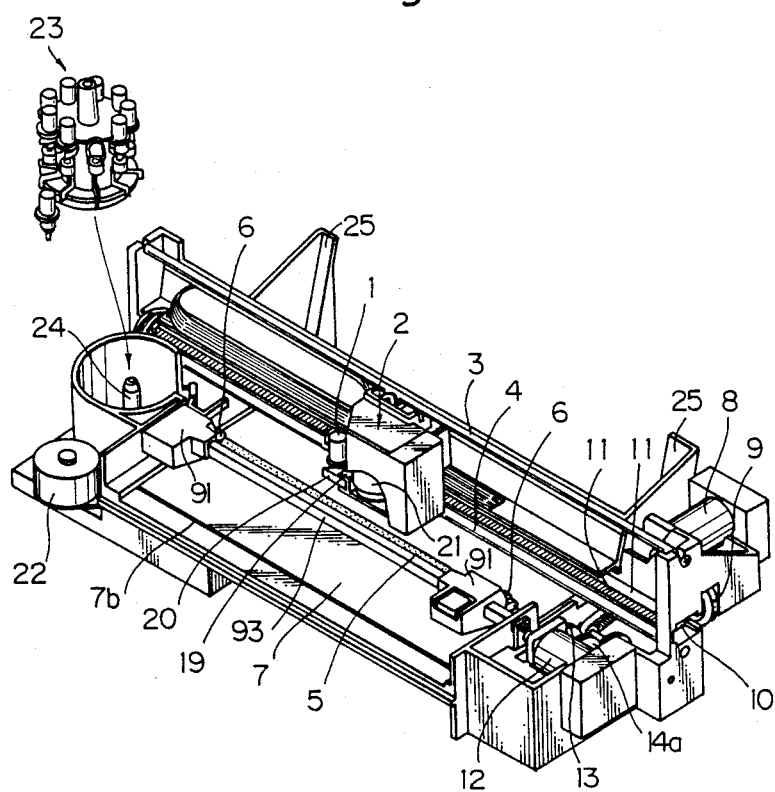
FIG. 2 is a perspective view of a main part of an x-y plotter shown in FIG. 1.

First, the basic principle of an x-y plotter will with reference to FIGS. 1 and 2. The x-y plotter has a carriage 2 which bears a writing pen 1 (or pencil or the like) and is driven by a main belt 11 connected to a carriage drive motor 8, so that the carriage 2 with the pen 1 is linearly moved in the right and left hand directions (x-directions) along parallel guide rods 3 and 4 extending in the x-directions.

A recording medium, such as a paper P, is located on a table 7 and is movably held by and between a friction roller 5 and pinch rollers 6 provided in the vicinity of the right and left ends of the table 7, as viewed from the front. The friction roller 5 is connected to a paper drive motor 12 (FIG. 2) to be rotated thereby, so that when the friction roller 5 is driven, the paper P can be moved in the y-directions perpendicular to the x-directions.

In the illustrated embodiment, a single friction roller 5 extends in the x direction throughout the width of the table 7.

The pen 1 is movably held by the carriage 2 so as to move up and down between a lower position in which the pen 1 comes into contact with the paper P on the table 7 to draw a desired letter or picture in accordance with the relative movement of the carriage 2 and the paper P in the orthogonal x-y plane, and an upper position in which the pen 1 is separated and lifted from the paper P. The upward and downward movement of the pen 1 is controlled by a control unit described hereinafter. When the pen 1 is moved in the x directions, the pen is brought to the upper position.

The x-y plotter has a pen holder 23 which detachably supports a plurality of pens 1 which can be selectively taken therefrom by the carriage 2. If the pens 1 held by the pen holder 23 have different colors, the multi-colored picture can be drawn by a selective use of different-colored pens 1.

The recording paper P are stored in a paper storage container 31 which can be detachably attached to the plotter body. When the drawing operation is finished for one paper P, a new paper P stocked in the container 31 is fed into the drawing area of the plotter body by the rotation of paper feed rollers 26 (FIG. 6), as is well known.

Numeral 50 designates a transparent or semitransparent plastic cover which covers the internal mechanism of the plotter when in use.

Figure 5:
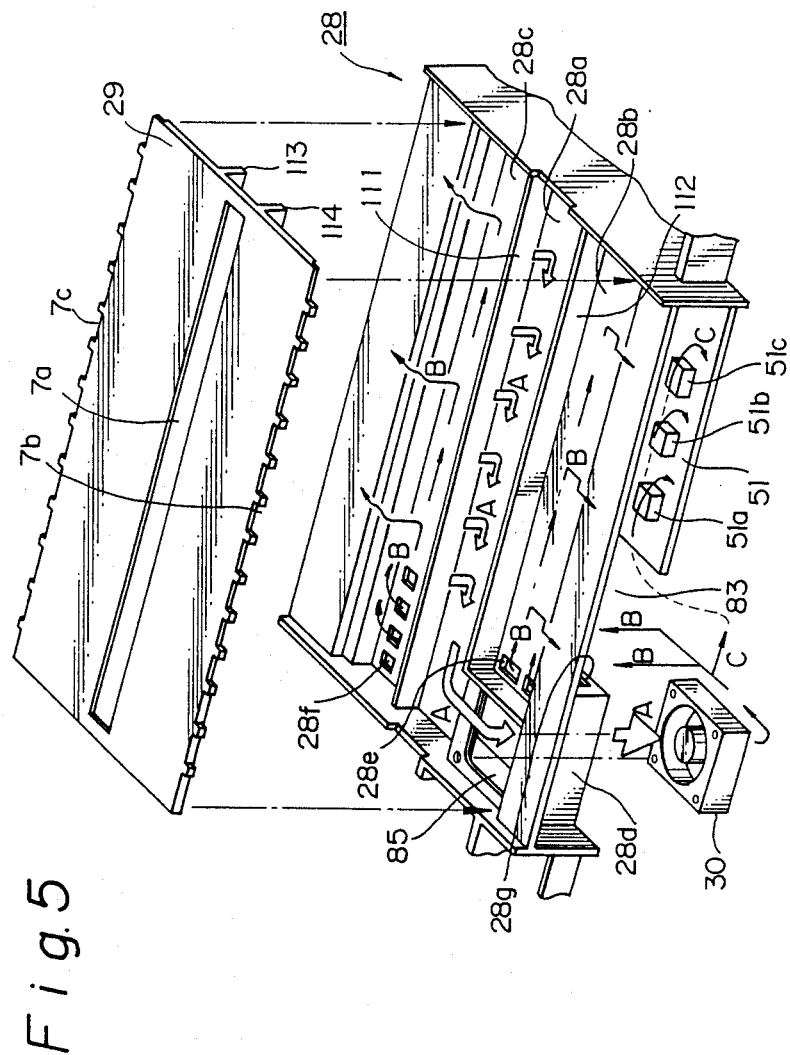
FIG. 5 is an exploded perspective view of a table on which a recording paper is carried, showing the flows of air according to an aspect of the present invention.
Figure 12:
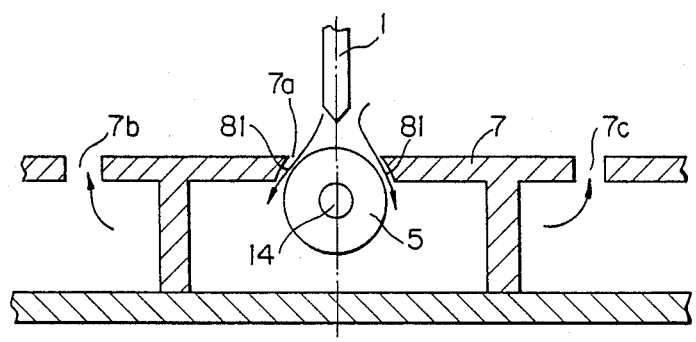

As shown in FIGS. 5 and 12, the table 7 is provided with an air introduction opening 7a, and air discharge openings 7b and 7c located on opposite sides of the air introduction opening 7a. Each of the openings 7a, 7b, and 7c is in the form of a continuous opening in the illustrated embodiment, but may be formed by discontinuously aligned holes. The air introduction opening 7a is located directly below the pen 1, which is carried by the carriage 2 so as to slide in the x-directions along a line parallel to the air introduction opening 7a. The friction roller 5 is located in the air introduction opening 7a, in such a manner that a slight clearance 81 is provided through which air can be introduced from the outside between the friction roller 5 and the edges of the air introduction opening 7a, as shown in FIG. 12 and as described in detail below. The pen 1 carried by the carriage 2 is located above the center of the friction roller 5, as shown in FIG. 12.

A fan motor 30 is provided in a connecting chamber 85 (FIG. 5) which is defined in a frame body 28 located under and connected to a plate 29 which forms the table 7. The fan motor 30 rotates so as to produce a suction air flow from air introduced through the air introduction opening 7a and discharges the suction air flow through the discharge openings 7b and 7c. The fan motor 30 also contributes to cooling electronic components and circuits 51a, 51b, 51c, etc. provided on a printed circuit board 51 (FIG. 5) and constituting a control unit of the x-y plotter.

The friction roller 5 is supported by a shaft 14 rotatably supported at opposite ends thereof by the frame body 28 and having a pulley 14a (FIG. 2), described hereinafter.

The carriage drive motor 8, which is supported in the frame body 28, rotates a drive shaft 10, rotatably supported by the frame body 28, through a timing belt 9 connected to the drive shaft of the motor 8 and the drive shaft 10. The main belt 11 extends along the main shafts 3 and 4 and is wound around the drive shaft 10 and another shaft (not shown) rotatably supported by the frame body 28 at the opposite end of the drive shaft 10 such that, when the motor 8 is rotated, the main belt 11 is rotated to move along the main shafts (i.e., parallel guide rods) 3 and 4. The carriage 2 is slidably supported along and on the main shafts 3 and 4 extending along the x-directions, and the main belt 11 is connected to the carriage 2 such that, when the main belt 11 is rotated, the carriage 2 can be linearly moved in the x-directions along the main shafts 3 and 4, whereby the pen 1 carried by the carriage 2 is also linearly moved in the x-directions.

The paper drive motor 12, which is supported in the frame body 28, is connected to the shaft 14 of the friction roller 5 through a timing belt 13 connected to the belt pulley 14a (FIGS. 2 and 7) such that, when the motor 12 is rotated, the friction roller 12 is rotated to feed the paper P held between the friction roller 12 and the pinch rollers 6, which are preferably made of rubber, in the y-directions.

The pinch rollers 6 are supported by respective supports 91 (FIGS. 1–4) which are, in turn, mounted on a common angle bar 93 rotatably supported by the frame body 28. One of the supports 91, for example, the right support 91 in FIG. 2, is slidably connected to the angle bar 93 so as to move away from and close to the other support (left support) 91, so that the distance between the pinch rollers 6 can be adjusted in accordance with the width of the recording paper P.

As can be seen from FIGS. 3 and 4, each of the supports 91 (only the right support 91 is shown in FIGS. 3 and 4) has an arm 95 which is rotatably supported thereby through a pin 96 and which has at one end a hole 95a in which the shaft 6a of the associated pinch roller 6 is press-fitted. The arm 95 is continuously biased by a torsion spring 98 located between the arm 95 and the support 91, so that the pinch rollers 6 are elastically, or resiliently, pressed against the friction roller 5 through the recording paper P, if positioned therebetween. The angle bar 93 has, for example, a rectangular or square cross section, and extends through the supports 91 to cause them to rotate together. Namely, when the angle bar 93 rotates about its axis, the supports 91 are rotated together about the center axis of the angle bar 93, whereby the pinch rollers 6 are separated from the recording paper P, and accordingly, the friction roller 5. The space of the support 91 through which the angle bar 93 extends is defined by a profiled member 99 rotatably mounted to the associated support 91 through a pin 97 (FIG. 3). The profile member 99 also serves as a stop for the angular displacement of the arm 95 about the pin 96 in the clockwise direction in FIG. 4. Note, this prevents a large rotation of the arm 95 about the pin 96 by the torsion spring 98, which would not allow the pinch rollers 6 to be separated from the recording paper P even if the supports 91 are rotated by the angle bar 93 to separate the pinch rollers 6 from the recording paper P, as mentioned above. Obviously, the above-mentioned stop defined by the underside of the profile member 99 does not prevent the elastic, or resilient, press-contact between the pinch rollers 6 and the recording paper P.

The angle bar 93 is provided on one end, for example, on the right end, with a lever 88 fixedly connected thereto by a machine screw 86 (FIG. 3). The lever 88 is provided on the lower end with a tensile spring 84 connected thereto, which biases the lever 88 in the clockwise direction so that the pinch rollers 6 are brought into elastic contact with the recording paper P or the friction roller 5. The spring force of the tensile spring 84 is stronger than that of the torsion spring 98, and the opposite end of the tensile spring 84 is connected to the frame body 28. To the lower end of the lever 88 is connected a wire 82, which is connected to a slide 39 which is slidably attached to the main shaft 4 through a pulley 80 rotatably supported on the frame body 28. The slide 39, which is guided by the main shaft 93, is moved thereon and therealong by the carriage 2, which moves along the main shafts 3 and 4, and thus, when the carriage 2 is moved to the right as viewed from the front, the slide 39 is moved in the same direction by the carriage 2 so that the wire 82 is pulled by the slide 39. As a result, the lever 88 is rotated in the counterclockwise direction as viewed from the right in FIG. 3, against the tensile spring 84, so that the angle bar 93 is rotated in the same direction to separate the pinch rollers 6 from the recording paper P. Note, the movement of the slide 39 is also associated with the operation of a clutch mechanism described below with reference to FIG. 7.

The friction roller 5 is preferably coated with finely divided hard metal grains to exhibit a file-like surface having a high friction coefficient, to prevent slippage of the recording paper, held at opposite ends between the pinch rollers 6 and the friction roller 5, from between the pinch rollers 6 and the friction roller 5.

The carriage 2, which is slidably mounted to the main shafts 3 and 4 and as shown in FIG. 2, has a movable portion 19 which is movable up and down relative to the body of the carriage 2, and the carriage 2 has an electromagnetic solenoid device 21 connected to the movable portion 19 to move the same up and down. The pen 1 is carried by an arm 20 integral with the movable portion 19, and is biased downward by a spring (not shown). When the solenoid device 21 is actuated, the movable portion 19 is moved up and down, and accordingly, the pen 1 comes into contact with and/or separates from the recording paper P.

The pen holder 23 is mounted to a pen holder shaft 24 provided on the frame body 28. The pen holder shaft 24 is connected to and rotated by a stepping motor 22 provided on the frame body 28. The pens 1 held by the pen holder 23 can be selectively taken out by the carriage 2 when the latter comes to the left end position, as described hereinafter.

On the back of the plotter body are provided right and left mounting frames 25 (FIG. 2) integral therewith, which receive the paper storage container 31 (FIG. 1). The container 31 has paper feed rollers 26 (FIG. 6) which feed out the papers stocked in the container 31, one by one. Only the uppermost paper is fed out from the container onto the table 7.

Note that a slight gap exists between the table 7 and the front edges of the frames 25, to allow the paper to pass therethrough and to move in the y-directions without interfering with the mounting frames 25 during drawing.

According to one aspect of the present invention, the frame body 28, which is preferably made of a plastic molding, together with the plate 29 of the table 7 defines therein the air introduction chamber 28a and two air discharge chambers 28b and 28c on the opposite sides of the air introduction chamber 28a, as mentioned before (FIG. 5). The air introduction chamber 28 is connected to the center air introduction opening 7a of the plate 29, and the air discharge chambers 28b and 28c are connected to the air discharge openings 7b and 7c of the plate 29, respectively. The air introduction chamber 28a and the air discharge chambers 28b and 28c are separated by separation walls 111, 112 provided on the frame body 28 and separation walls 113 and 114 provided on the bottom surface of the plate 29 (table 7). The separation walls 111 and 112 correspond to the separation walls 113 and 114 and come into contact therewith when the frame body 28 is closed or covered by the plate 29 (table 7), respectively. The separation wall 112 is partially cut away to allow communication between the air introduction chamber 28a and the air connecting chamber 85.

The air introduction chamber 28a is connected to the lower space 83 of the frame body 28 in which the printed circuit board 51 having the electronic components 51a, etc. is arranged, through the connecting chamber 85 in which the fan motor 30 is provided, as mentioned before. Note that the fan motor 30 is disassembled from the frame body 28 in the illustration of FIG. 5.

The air discharge chambers 28b and 28c have air holes 28e and 28f through which the air discharge chambers 28b and 28c are connected to the lower space 83 of the frame body 28, respectively, and thus the suction air flow introduced into the air introduction chamber 28a by the fan motor 30 through the air introduction opening 7a passes into the lower space 83 through the connecting chamber 85 and then passes into the air discharge chambers 28b and 28c through the respective air holes 28e and 28f, while cooling the electronic components of the printed circuit board (control unit) 51, respectively (see FIG. 5). The air which enters the air discharge chambers 28b and 28c is discharged to the outside from the air discharge openings 7b and 7c. Namely, when the fan motor 30 is rotated, a flow A of suction air and a flow B of discharge air are produced. The portion of the paper P located on the table 7 (plate 29) in the vicinity of the air introduction opening 7a, and accordingly in the vicinity of the front end (lower end) of the pen 1 carried by the carriage 2, is sucked by the suction air flow A onto the table 7, so that the portion of the paper P is brought into close contact with the paper P. On the other hand, the portions of the paper P located on the opposite sides of the air introduction opening 7a in the vicinity of the air discharge openings 7b and 7c are raised or lifted from the table 7, and thus separated therefrom. Therefore, not only is the separation of the paper P from the table 7 in the vicinity of the writing pen 1 prevented, but also noise produced by a frictional surface contact of the paper P with the table 7 during the movement of the paper P is lowered due to the air layers formed by the air discharged through the discharge openings 7b and 7c between the paper P and the table 7 on the opposite sides of the center air introduction opening 7a. This also contributes to an increase of the drawing speed.

Numeral 28g (FIG. 5) designates air holes provided on a side wall 28d integral with the frame body 28, which defines the connecting chamber 85 in which the fan motor 30 is located. The air holes 28g connect the connecting chamber 85 to the lower space 83 of the frame body 28, and a part (flow C) of the suction air is introduced into the lower space 83 through the air holes 28g to cool the printed circuit board 51. The lower space 83 can be an open space.

The contact pressure of the pen 1 on the recording paper P during drawing can be controlled by adjusting the height of the movable portion 19, which can be detected by a position sensor (not shown) to thereby control the operation of the electromagnetic solenoid 21 in a closed loop in accordance with the kind of pens 1. It is also possible to adjust or vary the contact pressure even during drawing. This control, per se, is well known.

The detection mechanism of the pen 1 will be described below.

Figure 8:
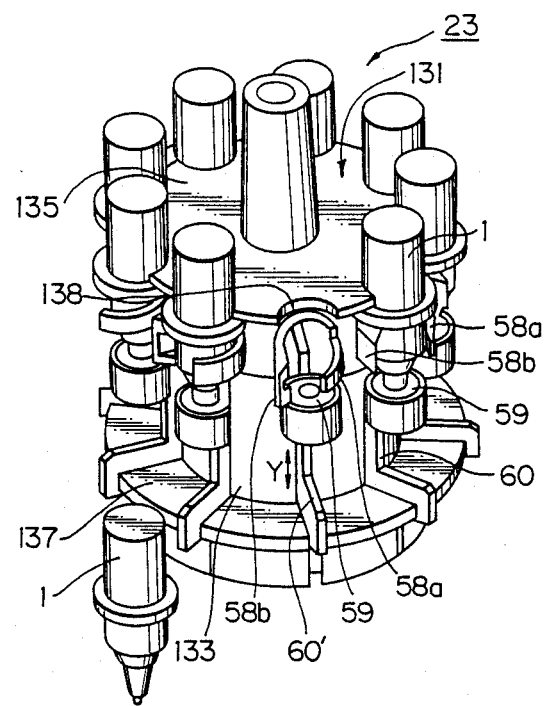
FIG. 8 is a schematical perspective view of a pen holder in an x-y plotter shown in FIG. 1.

As shown in FIG. 8, the pen holder 23 has a barrel (rotor) 131 having a cylindrical body 133 and upper and lower plates 135 and 137. The upper plate 135 is provided on the outer periphery thereof with a plurality of recesses 138 which form pen receiving portions in which the pens 1 are fitted. In the vicinity of each recess 138 are provided a pair of clamping levers 58a and 58b, which are provided on the barrel 131, to clamp the associated pen 1 therebetween. Namely, the pens 1 are firmly held by the respective pairs of clamping arms 58a and 58b. One of each pair of associated clamping levers 58a and 58b, e.g., the clamping levers 58b, is continuously biased by respective springs (not shown) thereby to close the pen receiving space defined between the associated clamping levers 58a and 58b of the pair, to thereby clamp the associated pen 1 in the corresponding pen receiving space. The lower plate 137 is provided on the outer periphery with a plurality of grooves or slits 139 in which pen cap supports 60 are fitted. The grooves 139 correspond to the recesses 138 of the upper plate 135. The pen caps 59, which are preferably made of rubber, are held by the pen cap supports 60 which are, in turn, supported by the cylindrical body 133 so as to move up and down, as shown by an arrow Y in FIG. 8. The pen caps 59, when located in the upper position, close the front ends (lower ends) of the associated pens 1 to prevent drying of the ink of the pens 1 or to protect the front ends of the pens 1 from dust or foreign matter otherwise contaminating same. The pen cap supports 60 are constantly biased into the upper position by springs (not shown).

The levers 58b and the arm 20 of the carriage 2 form a mechanical ratchet mechanism whereby, when the pen holder 23 is mounted on the plotter, the carriage 2 having no pen 1 is moved to the left, as viewed from the front, to take a predetermined pen 1 from the pen holder 23 into the carriage 2 at a pen transferring (exchanging) position. On the other hand, the pen 1 held by the carriage 2 also can be transferred to a desired pen receiving portion of the pen holder 23 at the pen transferring position. Thus, the automatic exchange of the pens 1 between the pen holder 23 and the carriage 2 can be achieved by the associated operations of the rotational movement of the pen holder 23, caused by the stepping motor 22, and the linear movement of the carriage 2 caused by the motor 8.

Figure 11:
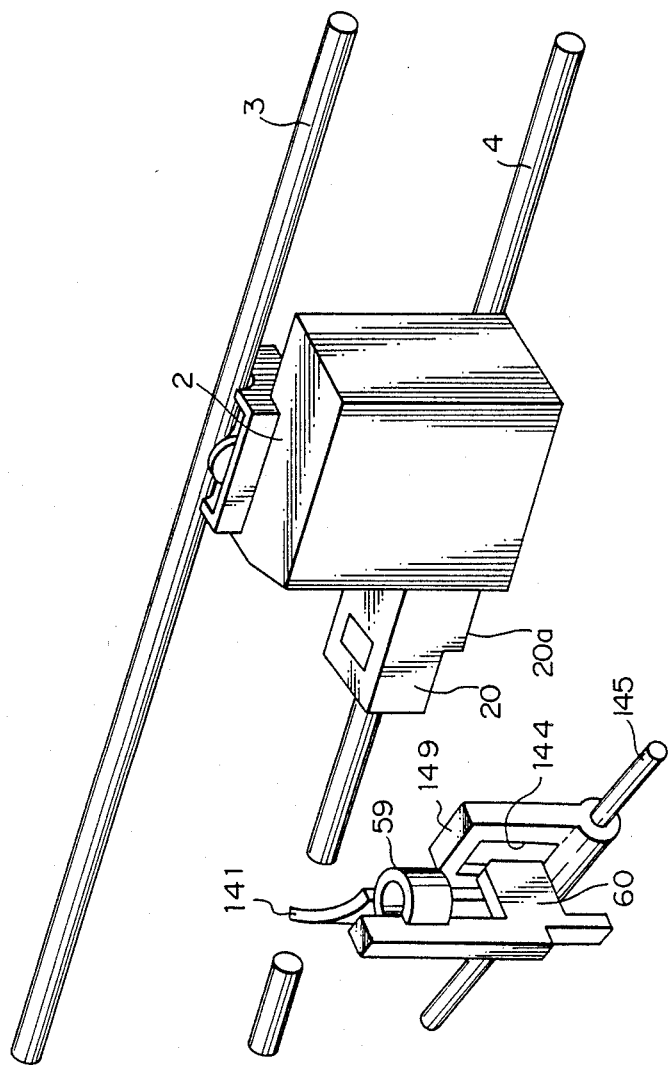
FIG. 11 is a schematic perspective view showing how to actuate a pen cap, shown in FIG. 1; and, FIG. 12 is an enlarged schematic sectional view of a pinch roller, showing the flows of air according to the present invention.

Namely, as shown in FIG. 11, when the carriage 2 slides to the left as viewed from the front, the downward projection 20a of the carriage 2 comes into contact with a cam 141 having an actuating lever 149 integral therewith and rotatably supported on a shaft 145 rigidly connected to the frame body 28 in the vicinity of the pen holder 23 at the pen transferring position in which one of the pen receiving recesses 138 is located in the extension of the linear track of the carriage 2 in the x-direction. The shaft 145 is rigidly connected to the frame body 28. The actuating lever 149 has an opening 144 in which the pen cap support 60 located in the pen transferring position can be engaged, whereby when the cam 141 is actuated by the projection 20a of the carriage 20, the actuating lever 149 is rotated about the shaft 145 in the counterclockwise direction to move the pen cap support 60 downward, and as a result, the pen cap 59 is disengaged from the front end of the associated pen 1 and the pen 1 can be exchanged.

After the pen 1 is removed from the recess 138 of the pen holder 23, the pen cap support 60 is moved upward by the spring to occupy an upper position shown at 60' in FIG. 8, as mentioned above. Namely, the pen cap support 60' occupies a higher position than that of the pen cap supports 60 holding the pens 1.

Figure 9:
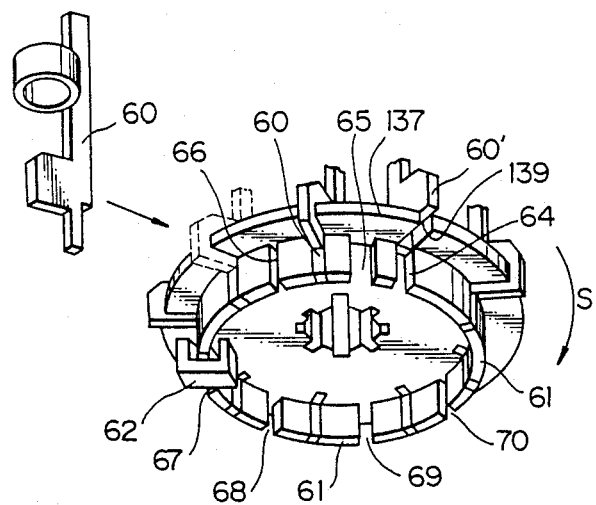
FIG. 9 is a schematical perspective view of a pen holder shown in FIG. 1, for explaining how to detect the presence or absence of a pen.

FIG. 9 shows a pen holder 23 as viewed from the bottom. The pen holder 23 has at the bottom thereof a cylindrical skirt 61 having main slits 64 corresponding to the grooves 139 of the lower plate 137 of the pen holder 23. When the pen cap supports 60 are located in the lower position, i.e., when the pens 1 are in the pen receiving portions of the pen holder 23 in which the front ends (lower ends) of the pens 1 are closed by the pen caps 59 held by the pen cap supports 60, the lower ends of the pen cap supports 60 are fitted in the corresponding main slits 64 of the skirt 61 of the pen holder 23. On the contrary, when the pen cap supports 60 are located in the upper position, i.e., when the pens 1 are not in the pen receiving portions of the pen holder 23, the lower ends of the pen cap supports 60 are disengaged from the corresponding main slits 64 of the skirt 61 of the pen holder 23.

A photointerrupter 62 having a light emitter and a light receiver opposed to the light emitter is provided on the frame body 28, so that the skirt portion 61 of the pen holder 23 is located between the light emitter and the light receiver of the photointerrupter. Consequently, on one hand, when the pen cap supports are in the corresponding slits 4, the light path of the photointerrupter is interrupted, and on the other hand, when the pen cap supports are not in the corresponding slits 4, the light emitted from the light emitter is received by the light receiver, and thus the presence or absence of the pen cap supports 60 in the associated main slits 64, and accordingly, the presence or absence of the pens 1 in the corresponding pen receiving portions of the pen holder 23, can be optically detected by the photointerrupter 62, when the photointerrupter is interrupted, and on the other hand, when the pen cap supports are not in the corresponding slits 4, the light emitted from the light emitter is received by the light receiver, and thus the presence or absence of the pen cap supports 60 in the associated main slits 64, and accordingly, the presence or absence of the pens 1 in the corresponding pen receiving portions of the pen holder 23, can be optically detected by the photointerrupter 62, when the pen holder 23 is rotated by the stepping motor 22.

Furthermore, in addition to the main slits 64, a plurality of auxiliary slits 65-70 are provided in the skirt portion 61 of the pen holder 23. The auxiliary slits 65-70 are located between the main slits 64, and are used to detect a reference angular position of the pen holder 23, the direction of the rotational movement of the pen holder 23, and an identification of the pen holders when a plurality of pen holders 23 are used. This detection will be described below with reference to FIG. 10, which shows outputs of the photointerrupter 62.

Figure 10:
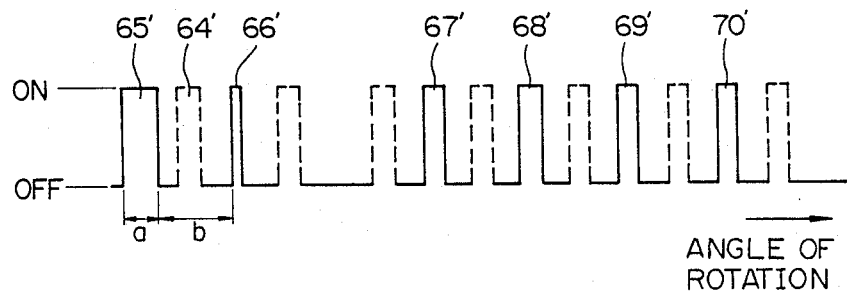
FIG. 10 is a diagram showing an output of a photointerrupter of an optical detecting mechanism shown in FIG. 9.

In FIG. 10, the dotted line 64' shows the outputs corresponding to the main slits 64 in accordance with the presence and absence of the pens 1. The outputs 65'-70' correspond to the auxiliary slits 65-70.

The reference angular position of the pen holder 23 is detected by the slits 65 and 66 having different widths. In the illustrated embodiment, the slit 65 has a wider width than the slit 66. The stepping motor 22, which drives the pen holder 23, controls the rotation angle thereof in accordance with the number of drive pulses, and while the pen holder 23 is rotated by the stepping motor 22, the wider slit 65 (pulse 65') is first detected by the photointerrupter 62. Thereafter, the pen holder 23 is rotated by an angle b, which corresponds to the angular distance between the slit 65 and the slit 66, so that the slit 66 (pulse 66') is detected. This is the reference angular position. Namely, the reference angular position is obtained when the slit 66 is first detected after the wider slit 656 is detected. The direction of the rotational movement of the pen holder is also recognized to be S (FIG. 9) when the slit 66 is detected after the detection of the wider slit 65. After the reference position is detected, a predetermined number of pulses corresponding to the position of the desired pen 1 are supplied to the stepping motor 22, and by detecting the pulse which represents the slit 64, the presence (or absence) of the pen is detected.

The slits 67-70 are used to identify the pen holder 23. Namely, when a plurality of pen holders 23 having, for example, different kinds of writing tools (pens, pencils, etc.) or different writing pressures of writing tools, are selectively ad exchangeably used, it is necessary to identify the pen holder to be used. The identical slits 67-70 serve as a bar code. Namely, the slits 67-70 can be selectively filled with proper fillers (not shown) which interrupt the light. It will be easily understood that, when the number of the identical slits is 4 (67-70), $2^4$ (=16) kinds of pen holders can be discriminated. The number of identical slits for the discrimination is not limited to 4 and can be less than or more than 4 in accordance with the kind of the pen holders 23 to be used. Note that pulses (outputs of the photointerrupter) 67', 68', 69' and 70' in FIG. 10 correspond to the slits 67, 68, 69 and 70, respectively.

This makes it possible to use various pens for special purposes, such as a pen having a correcting liquid for correcting the drawn picture, instead of an ink, or a pen having an eraser at the front end. Further, since the writing pressure or the height of the pens can be optionally adjusted, it is also possible to use a hair-pencil to draw a hair-line picture or letter while varying the writing pressure.

Figure 7:
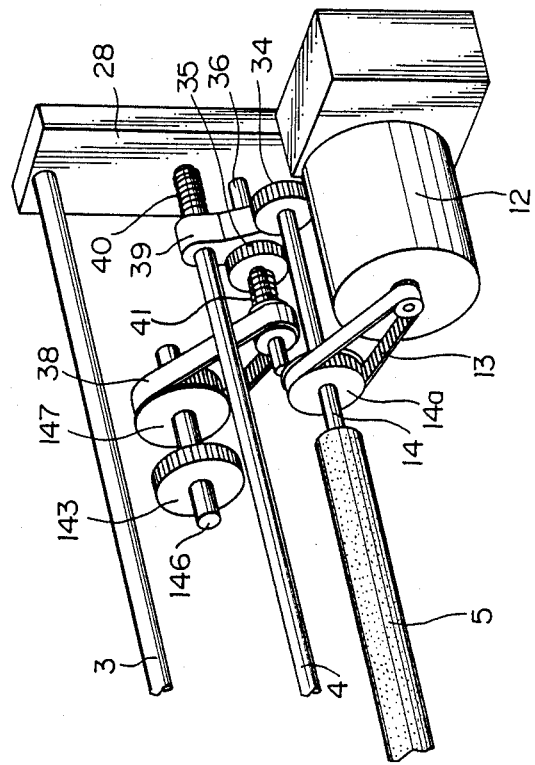
FIG. 7 is a perspective view of a clutch mechanism in an x-y plotter shown in FIG. 1.

FIG. 7 shows a mechanism for rotating the feed roller 26 of the paper P. The drive source, i.e., the motor 12 for moving the paper P during drawing, can also be used as a drive source of the feed rollers 26 for feeding the paper from the paper storage container 31. The rotation of the motor 12 is transmitted to a feed roller shaft 33 of the feed rollers 26 only when the paper should be fed into the drawing area of the plotter from the container 31, by a clutch mechanism described below.

In FIG. 7, the friction roller shaft 14, which is rotatably supported by the frame body 28, has a gear 34 integrally connected thereto which is in mesh with a gear 35 slidably and rotatably supported by and on a shaft 36 supported by the frame body 28. The gear 35 is continuously biased in to the right in FIG. 7 by a spring 41 wound around the shaft 36. The movement of the gear 35 to the right is stopped by the slide 39, which is slidably supported on the main shaft 4. The slide 39 is maintained at the initial position shown in FIG. 7 by a coil spring 40 which is stronger than the spring 41 of the gear 35. The gear 35 is mounted to the shaft 36, for example, through a spline or non-circular cross sectional shape therebetween, so as to rotate with the shaft 36 and to slide relatively thereon. The gear 35 is engaged by the gear 34 when the gear 35 is moved to the right in FIG. 7 by the spring 40. The slide movement of the gear 35 on the shaft 36 by the spring 41 occurs when the stop formed by the slide 39 is released from the gear 35, i.e., when the slide 39 is moved to the right against the spring 40.

The shaft 36 has a pulley 37 which is connected to a pulley 147 mounted to a shaft 146 rotatably supported by the frame body 28 through a belt 38. The shaft 146 has a gear 143 which can be engaged by a gear 161 (FIG. 6) mounted to a shaft 163 rotatably supported by the side walls of the paper container 31, when the container 31 is set in the guide frames 25 of the plotter body.

The gear 161 is in mesh with a gear 165 rigidly connected to the feed roller shaft 33 rotatably supported by the side walls of the container 31.

Normally, i.e., during the drawing operation, the gear 35 is disengaged from the gear 34, since the gear 35 is maintained in the idle position (FIG. 7) by the stop formed by the slide 39, which is in turn maintained in the initial position by the spring 40, so that the rotation of the motor 12 is not transmitted to the feed rollers 26. Namely, no paper feed occurs.

Upon completion of the drawing operation, the drawn paper on which the picture or letter, etc. has been drawn is moved on the table 7 until the rear end of the paper is disengaged from the pinch rollers 6 and the friction roller 5 and discharged from the plotter. Thereafter, when the carriage 4 is moved along the main shafts 3 and 4 toward the right end as viewed from the front, and into a non-drawing area in which no drawing is effected, the carriage 2 comes into contact with the slide 39 to move the same to the right against the spring 40. As a result, the gear 35, which is continuously pressed to the right by the spring 41, slides to the right to be engaged with the gear 34, so that the rotation of the friction roller shaft 14 is transmitted to the shaft 36. In this state, when the motor 12 is rotated, the feed rollers 26 are rotated to feed the paper P.

Consequently, a new paper P is fed onto the table 7 from the paper storage container 31, and thereafter, the carriage 2 is moved to the left toward the drawing area, so that the slide 39 is moved to the left by the spring 40 to disengage the gear 35 from the gear 34, whereby the rotational transmission between the motor 12 and the feed rollers 26 is stopped and the drawing operation can be effected again by the motor 12. As can be seen from the above, the feed rollers 26 can be selectively actuated by the paper drive motor 12 through the clutch mechanism when drawing is not effected.

Figure 6:
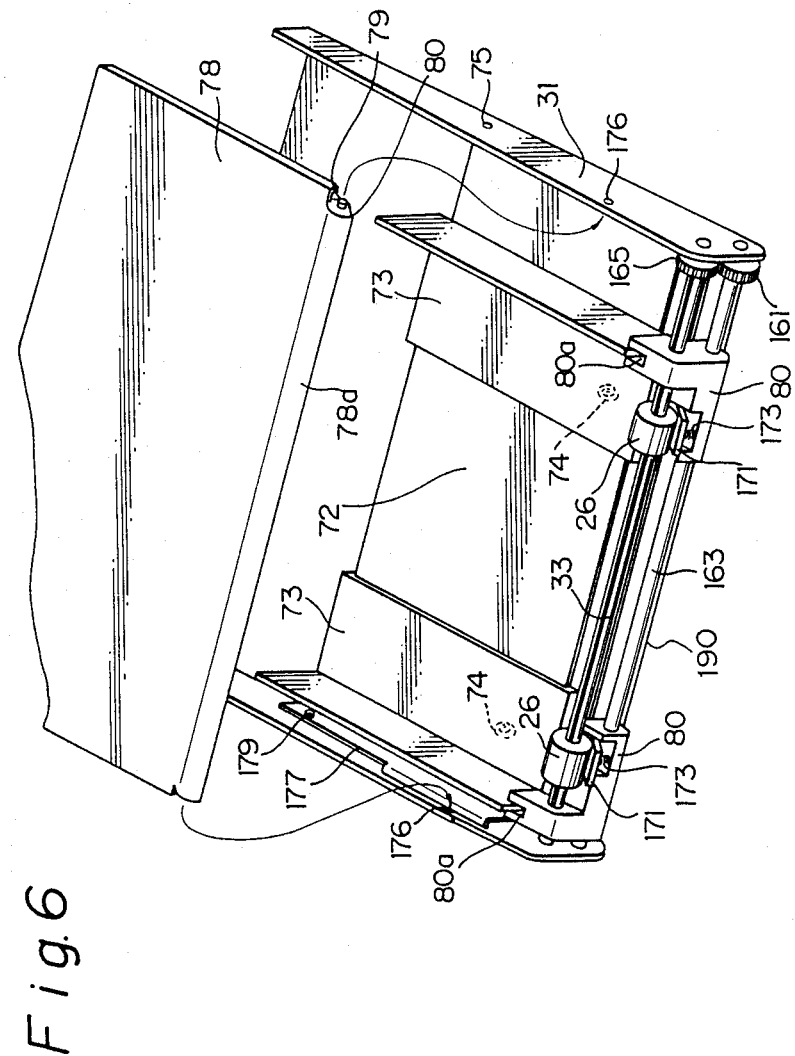
FIG. 6 is an exploded perspective view of a paper storage container shown in FIG. 1.

The paper storage container (body) 31 has a movable (swingable) plate 72 located on a bottom plate 190 of the container, on which new papers P are stocked (FIG. 6). A pair of slidable side plates 73, which are generally L-shaped, are provided on the movable plate 72. The distance between the side plates 73 is adjusted in accordance with the size of the paper P (A4, B5, B4 size etc.) The side plates 73 are engaged in channels 80a of respective slide blocks 80 slidably attached to the shafts 163 and 33 and having the feed rollers 26, so that the feed rollers 26 can be moved along the shafts 33 together with the respective slide blocks 80 to change the distance between the feed rollers 26 in accordance with the size of the paper P, corresponding to the side plates 73.

The movable plate 72 is pivoted at one end to the side walls of the container 31 through pins 75 and is biased upward at the opposite end or the vicinity thereof by coil springs 74 provided between the bottom plate 190 and the swingable plate 72, so that the movable plate 72 tends to rotate about the pivot pin 75. The slide blocks 80 have counter plates 171 elastically pressed against the respective feed rollers 26 by springs 173, so that the paper P can be fed by and between the feed rollers 26 and the counter plates 171, one by one, when the feed rollers 26 are rotated.

The container 31 has actuating plates 177 which are pivoted to the side walls of the container through pivot pins 179, and are continuously biased upward by springs (not shown). A transparent cover 78 is detachably attached to the container through pins 79 inserted in corresponding pin holes 176 provided on the side walls of the container, so that the cover can be rotatably opened and closed about the pins 79. When the cover 78 is rotated about the pins 79 to open the same, the curved front edge 78a thereof presses down the front ends of the actuating plates 177 far from the pins 179, so that the lower edges of the actuating plates 177 press the movable plate 72 against the springs 74, whereby the papers stocked in the container are lowered to separate the uppermost paper from the feed rollers 26. Therefore, new papers can be easily inserted onto the papers already stocked in the container by only opening the cover 78, without removing the container from the plotter body.

The present invention is not limited to the embodiments illustrated in the drawings and described above, but can be modified without deviating from the spirit of the invention by a skilled person in this field.

We claim:

1. An x-y plotter comprising a table on which a recording medium is to be carried, a linearly movable carriage which supports a writing tool for common movement with the carrier along a predetermined line of travel and so as to permit movement of the writing tool in up and down directions relative to the surface of the recording medium, and means for linearly moving the recording medium along the plane of the medium in directions perpendicular to the direction of the movement of the carriage and thus the predetermined line of travel of the writing tool, the improvement comprising first means for bringing only the portion of the recording medium located in the vicinity of the travel line along which the writing tool moves into close contact with the table and for lifting at least the portions of the recording medium located on the opposite sides of the travel line, as viewed in the direction of the movement of the recording medium, and thereby separating said portions from said table.

2. An x-y plotter according to claim 1, wherein said recording medium is a paper.

3. An x-y plotter according to claim 2, further comprising second means for controlling the respective movements of the carriage and the recording medium.

4. An x-y plotter according to claim 3, wherein said controlling means comprises a printed circuit board on which electronic components are mounted.

5. An x-y plotter according to claim 4, wherein said first means comprises an air suction opening extending along the travel line, through which the recording medium can be sucked by suction air flow through the air suction opening, and air discharge openings through which the suction air flow can be discharged to lift the portions of the recording medium located on the opposite sides of the travel line from the table, said air discharge openings being located on opposite sides of the air suction opening, as viewed in the direction of the movement of the recording medium.

6. An x-y plotter according to claim 5, further comprising a suction air flow producing means for producing the suction air flow.

7. An x-y plotter according to claim 6, wherein said air suction opening comprises plural discontinuous air suction ports are aligned along the travel line.

8. An x-y plotter according to claim 7, wherein each of said air discharge openings comprises plural discontinuous air discharge ports, aligned along lines substantially parallel to and displaced from the aligned air suction ports.

9. An x-y plotter according to claim 8, wherein said suction air producing means comprises a fan motor.

10. An x-y plotter according to claim 9, further comprising drive means for driving the fan motor.

11. An x-y plotter according to claim 10, further comprising an air passage means for connecting the air suction opening and the air discharge openings.

12. An x-y plotter according to claim 11, wherein said air passage means comprises an air suction chamber connected to the air suction opening and an air discharge chamber connected to the air discharge openings and connected to the air suction chamber through the fan motor, so that when the fan motor is driven, ambient air is sucked into the air suction chamber through the air suction opening and discharged from the air discharge chamber through the air discharge openings.

13. An x-y plotter according to claim 12, wherein said air passage means further comprises a connecting chamber for connecting the air suction chamber and the air discharge chamber and encompassing the printed circuit board, so that the electronic components on the printed circuit board are cooled by the suction air flow.

14. An x-y plotter according to claim 5, further comprising a friction roller located in the air suction opening to move the paper on the table.

15. An x-y plotter according to claim 1, wherein said writing tool is a pen containing an ink.

16. An x-y plotter according to claim 15, further comprising a pen holder having a rotor which can detachably hold a predetermined number of writing pens provided on the periphery of the rotor, said rotor being provided on a periphery thereof with slits in which the associated writing pens can be fitted, and pen caps which are movably supported on the rotor to cap the lower ends of the writing pens, said pen caps being movable between an upper position in which the pen caps occupy an upper position when the writing pens are in the corresponding slits of the rotor and a lower position in which the pen caps cap the lower ends of the corresponding writing pens, and a detecting means for detecting the slits of the rotor to detect the presence of the writing pens therein.

17. An x-y plotter according to claim 16, further comprising pen cap supports which are movably supported on the rotor of the pen holder to support the associated pen caps.

18. An x-y plotter according to claim 17, further comprising means for intermittently rotating the rotor.

19. An x-y plotter according to claim 18, wherein said rotor rotates to selectively occupy a pen exchanging position which is located in an extension of the line of travel of the writing pen held by the carriage, so that an exchange of the writing pens can be effected between the pen holder and the carriage at the pen exchanging position.

20. An x-y plotter according to claim 19, wherein said detecting means comprises a photointerrupter having a light emitter and a light receiver opposed to the light emitter, said slits being located between the light emitter and the light receiver to enable detection of the slits and thereby of the presence of the writing pens in the slits.

21. An x-y plotter according to claim 20, wherein said slits include at least one reference slit which represents a reference position of the angular position of the pen holder, and identification slits which identify, in combination, the associated pen holder.

22. An x-y plotter according to claim 1, wherein said plotter comprises a plotter body having a guide frame, and further comprises a container for storing a stock of the recording media, which can be removably attached to the guide frame.

23. An x-y plotter according to claim 22, wherein said container comprises at least one feed roller which is supported on a shaft rotatably supported by the plotter body to feed the recording medium from the container into the plotter body.

24. An x-y plotter according to claim 23, further comprising an electrically driven motor, said feed roller shaft being kinematically connected to the motor for rotation of the feed roller by the motor.

25. An x-y plotter according to claim 24, further comprising clutch means connecting the feed roller shaft to the motor of the recording medium moving means for selectively transmitting the motor drive to the feed roller shaft.

26. An x-y plotter according to claim 25, wherein said feed roller shaft has a gear secured thereto and wherein said clutch means comprises a gear train which connects the gear of the feed roller shaft to the motor.

27. An x-y plotter according to claim 26, wherein said gear train comprises a movable gear which selectively establishes the connection of the motor and the feed roller shaft.

28. An x-y plotter according to claim 27, further comprising a member which actuates the movable gear.

29. An x-y plotter according to claim 28, wherein said member is a movable stop which comes into contact with the movable gear to maintain the same at an inoperative position in which the motor and the feed roller shaft are disconnected.

30. An x-y plotter according to claim 29, further comprising a biasing spring for biasing the movable gear into an operative position in which the connection between the motor and the feed roller shaft is established, so that when the movable stop s released from the movable gear, the movable gear is brought into the operative position by the biasing spring.

31. An x-y plotter according to claim 30, further comprising at least one guide rod along which the carriages moves and wherein said stop is supported on the guide rod, so that the stop can be moved by the carriage.

32. An x-y plotter according to claim 22, wherein said container comprises a body with a bottom, a movable plate which is pivoted at one end to the body on the bottom so as to rotate about the pivot, and spring means for biasing the movable plate to rotate about the pivot.

33. An x-y plotter according to claim 32, wherein said container further comprises a cover which is rotatably attached to the container body so as to open and close.

34. An x-y plotter according to claim 33, wherein said container further comprises actuating plates which are rotatably attached to the container body for pressing the movable plate against the spring means to rotate the movable plate about the pivot, so that when the cover is opened, the actuating plates are pressed down by the cover for rotating the movable plate about the pivot.

* * * * *

UNITED STATES PATENT AND TRADEMARK OFFICE
CERTIFICATE OF CORRECTION

PATENT NO. : 4,970,662

DATED : Nov. 13, 1990

INVENTOR(S) : TANAKA et al.

It is certified that error appears in the above-identified patent and that said Letters Patent is hereby corrected as shown below:

Col. 4, line 4, after "will" insert --be briefly discussed--.

Col. 10, line 50, change "ad" to --and--.

Signed and Sealed this

Twenty-eighth Day of July, 1992

*Attest:*

DOUGLAS B. COMER

*Attesting Officer*  *Acting Commissioner of Patents and Trademarks*